United States Patent
Khadiwala et al.

(10) Patent No.: US 11,115,221 B2
(45) Date of Patent: Sep. 7, 2021

(54) VERIFYING A REBUILT ENCODED DATA SLICE USING SLICE VERIFICATION INFORMATION

(71) Applicant: International Business Machines Corporation, Armonk, NY (US)

(72) Inventors: Ravi V. Khadiwala, Bartlett, IL (US); Jason K. Resch, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 1009 days.

(21) Appl. No.: 15/411,468

(22) Filed: Jan. 20, 2017

(65) Prior Publication Data

US 2017/0132272 A1    May 11, 2017

Related U.S. Application Data

(63) Continuation-in-part of application No. 15/082,887, filed on Mar. 28, 2016, now Pat. No. 10,402,122.
(Continued)

(51) Int. Cl.
*G06F 16/00* (2019.01)
*H04L 9/32* (2006.01)
(Continued)

(52) U.S. Cl.
CPC ........ *H04L 9/3247* (2013.01); *G06F 11/1088* (2013.01); *H04L 63/123* (2013.01); *H04L 67/1097* (2013.01)

(58) Field of Classification Search
CPC .. G06F 11/1088; H04L 63/123; H04L 9/3247; H04L 63/08; H04L 67/3247
See application file for complete search history.

(56) References Cited

U.S. PATENT DOCUMENTS 4,092,732 A    5/1978 Duchi
5,454,101 A    9/1995 Mackay et al.
(Continued)

OTHER PUBLICATIONS

Efficient Public Verification of Data Integrity for Cloud Storage Systems from Indistinguishability Obfuscation, Zhang et al., IEEE (Year: 2017).*

(Continued)

*Primary Examiner* — Jean M Corrielus
(74) *Attorney, Agent, or Firm* — Garlick & Markison; Timothy W. Markison; Harry S. Tyson, Jr.

(57) ABSTRACT

Methods for verifying rebuilt data in a dispersed storage network (DSN). In various examples, a storage unit of the DSN receives a rebuilt encoded data slice of a set of encoded data slices and a set of corresponding integrity values. An integrity function is performed on the set of integrity values to calculate an integrity value of the set of integrity values, which is then compared to a locally stored value. If the values match, the set of integrity values is validated. Another integrity function is performed on the rebuilt encoded data slice to produce a calculated integrity value of the received encoded data slice. The encoded data slice is validated and stored when the calculated integrity value compares favorably to the corresponding value of the validated set of integrity values. Proof of authenticity information from other storage units may be employed to further validate the set of integrity values.

20 Claims, 10 Drawing Sheets

Related U.S. Application Data

(60) Provisional application No. 62/168,145, filed on May 29, 2015.

(51) Int. Cl.
*H04L 29/08* (2006.01)
*H04L 29/06* (2006.01)
*G06F 11/10* (2006.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,990,664 | B2 * | 3/2015 | Resch ............. G06F 11/08 714/776 |
| 9,063,881 | B2 * | 6/2015 | Grube ............ G06F 11/0727 |
| 9,063,968 | B2 * | 6/2015 | Resch ............ H04L 67/1097 |
| 9,141,297 | B2 * | 9/2015 | Resch ............. G06F 11/1076 |
| 9,146,810 | B2 * | 9/2015 | Resch ............. G06F 11/1088 |
| 9,274,977 | B2 * | 3/2016 | Resch ............ H04L 67/1097 |
| 9,311,179 | B2 * | 4/2016 | Kazi ............... H03M 13/616 |
| 9,507,786 | B2 * | 11/2016 | Dhuse ............. G06F 11/08 |
| 9,514,132 | B2 * | 12/2016 | Resch ............. G06F 11/08 |
| 9,606,858 | B2 * | 3/2017 | Resch ............. G06F 11/10 |
| 9,665,429 | B2 * | 5/2017 | Resch ............. G06F 21/62 |
| 9,715,504 | B2 * | 7/2017 | Dhuse ............ G06F 11/08 |
| 9,767,109 | B2 * | 9/2017 | Resch ............. G06F 11/08 |
| 9,891,829 | B2 * | 2/2018 | Resch ............ G06F 11/1092 |
| 10,015,255 | B2 * | 7/2018 | Dhuse ............ H04L 67/1097 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au |
| 2007/0234110 | A1 | 10/2007 | Soran |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2013/0198588 | A1 * | 8/2013 | Resch ............. G06F 3/0619 714/763 |
| 2013/0232503 | A1 * | 9/2013 | Volvovski ............ G06F 9/50 718/104 |
| 2013/0325820 | A1 * | 12/2013 | Grube ............ G06F 11/076 707/691 |
| 2013/0346809 | A1 * | 12/2013 | Kazi ............... H03M 13/05 714/48 |
| 2014/0068259 | A1 * | 3/2014 | Resch ............. H04L 9/0861 713/167 |
| 2014/0351891 | A1 * | 11/2014 | Grube ............ G06F 11/0727 726/3 |
| 2015/0154074 | A1 * | 6/2015 | Resch ............. G06F 16/00 714/764 |
| 2015/0242273 | A1 * | 8/2015 | Resch ............. G06F 21/62 714/763 |
| 2015/0355966 | A1 * | 12/2015 | Resch ............. G06F 3/0619 714/766 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working—Group; RFC 4512; Jun. 2006; pp. 1-49.

(56) References Cited

OTHER PUBLICATIONS

Sciberras; Lightweight Directory Access Protocol (LDAP): Schema for User Applications; IETF Network Working Group; RFC 4519; Jun. 2006; pp. 1-33.
Harrison; Lightweight Directory Access Protocol (LDAP): Authentication Methods and Security Mechanisms; IETF Network Working Group; RFC 4513; Jun. 2006; pp. 1-32.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 1511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium pn High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

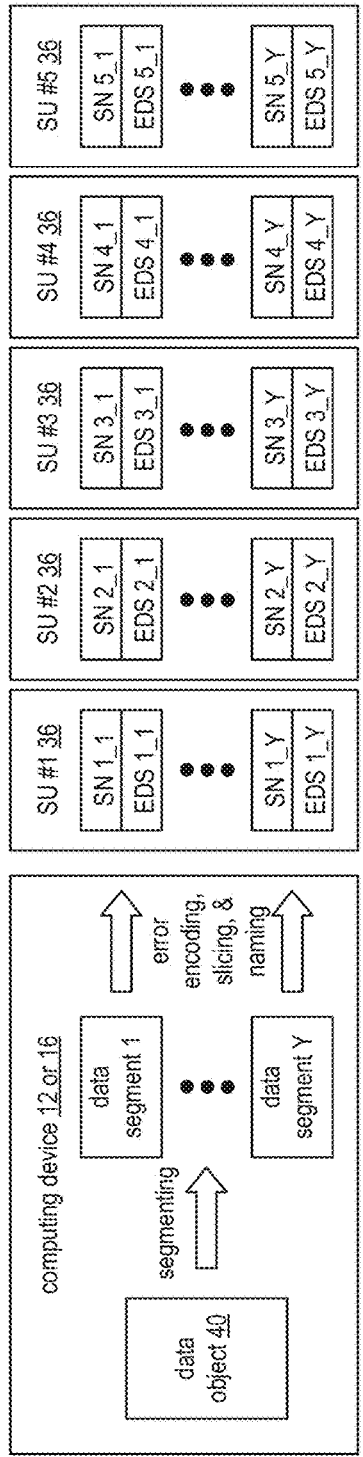
FIG. 3
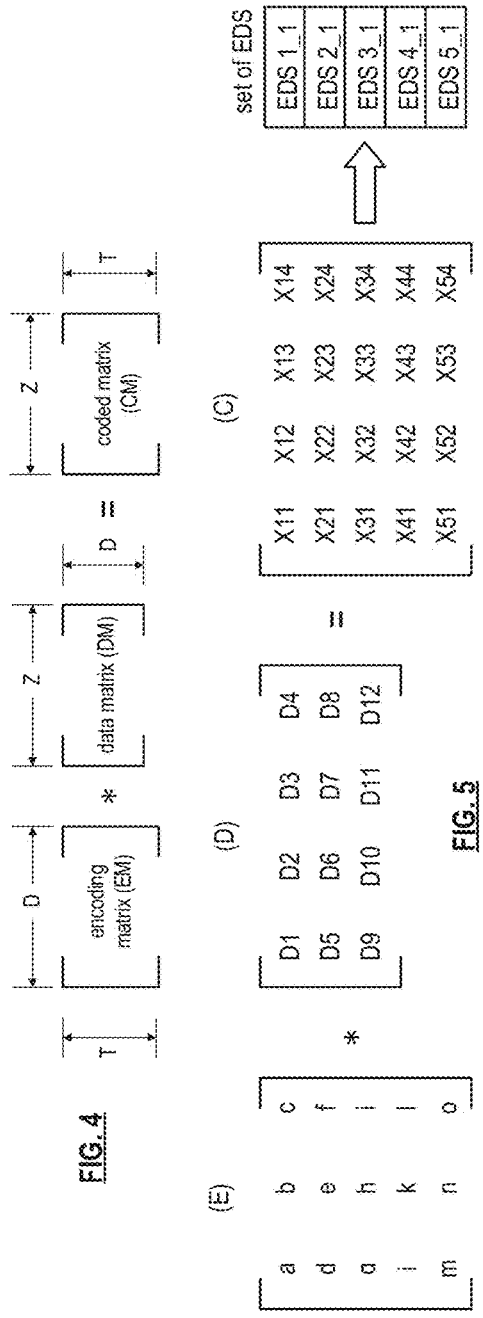
FIG. 4
FIG. 5
FIG. 6

VERIFYING A REBUILT ENCODED DATA SLICE USING SLICE VERIFICATION INFORMATION

CROSS-REFERENCE TO RELATED APPLICATIONS

The present U.S. Utility Patent Application claims priority pursuant to 35 U.S.C. §120 as a continuation-in-part of U.S. Utility application Ser. No. 15/082,887, entitled "TRANSFERRING ENCODED DATA SLICES IN A DISPERSED STORAGE NETWORK", filed Mar. 28, 2016, which claims priority pursuant to 35 U.S.C. §119(e) to U.S. Provisional Application No. 62/168,145, entitled "TRANSFERRING ENCODED DATA SLICES BETWEEN STORAGE RESOURCES", filed May 29, 2015, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks, and more particularly to rebuilding and verifying data slices in a dispersed storage network.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on a remote storage system. The remote storage system may include a RAID (redundant array of independent disks) system and/or a dispersed storage system that uses an error correction scheme to encode data for storage.

In a RAID system, a RAID controller adds parity data to the original data before storing it across an array of disks. The parity data is calculated from the original data such that the failure of a single disk typically will not result in the loss of the original data. While RAID systems can address certain memory device failures, these systems may suffer from effectiveness, efficiency and security issues. For instance, as more disks are added to the array, the probability of a disk failure rises, which may increase maintenance costs. When a disk fails, for example, it needs to be manually replaced before another disk(s) fails and the data stored in the RAID system is lost. To reduce the risk of data loss, data on a RAID device is often copied to one or more other RAID devices. While this may reduce the possibility of data loss, it also raises security issues since multiple copies of data may be available, thereby increasing the chances of unauthorized access. In addition, co-location of some RAID devices may result in a risk of a complete data loss in the event of a natural disaster, fire, power surge/outage, etc.

BRIEF DESCRIPTION OF THE SEVERAL VIEWS OF THE DRAWING(S)

FIG. 3 is a schematic block diagram of an example of dispersed storage error encoding of data in accordance with the present disclosure;

FIG. 4 is a schematic block diagram of a generic example of an error encoding function in accordance with the present disclosure;

FIG. 5 is a schematic block diagram of a specific example of an error encoding function in accordance with the present disclosure;

FIG. 6 is a schematic block diagram of an example of slice naming information for an encoded data slice (EDS) in accordance with the present disclosure;

DETAILED DESCRIPTION OF THE INVENTION

Figure 1:
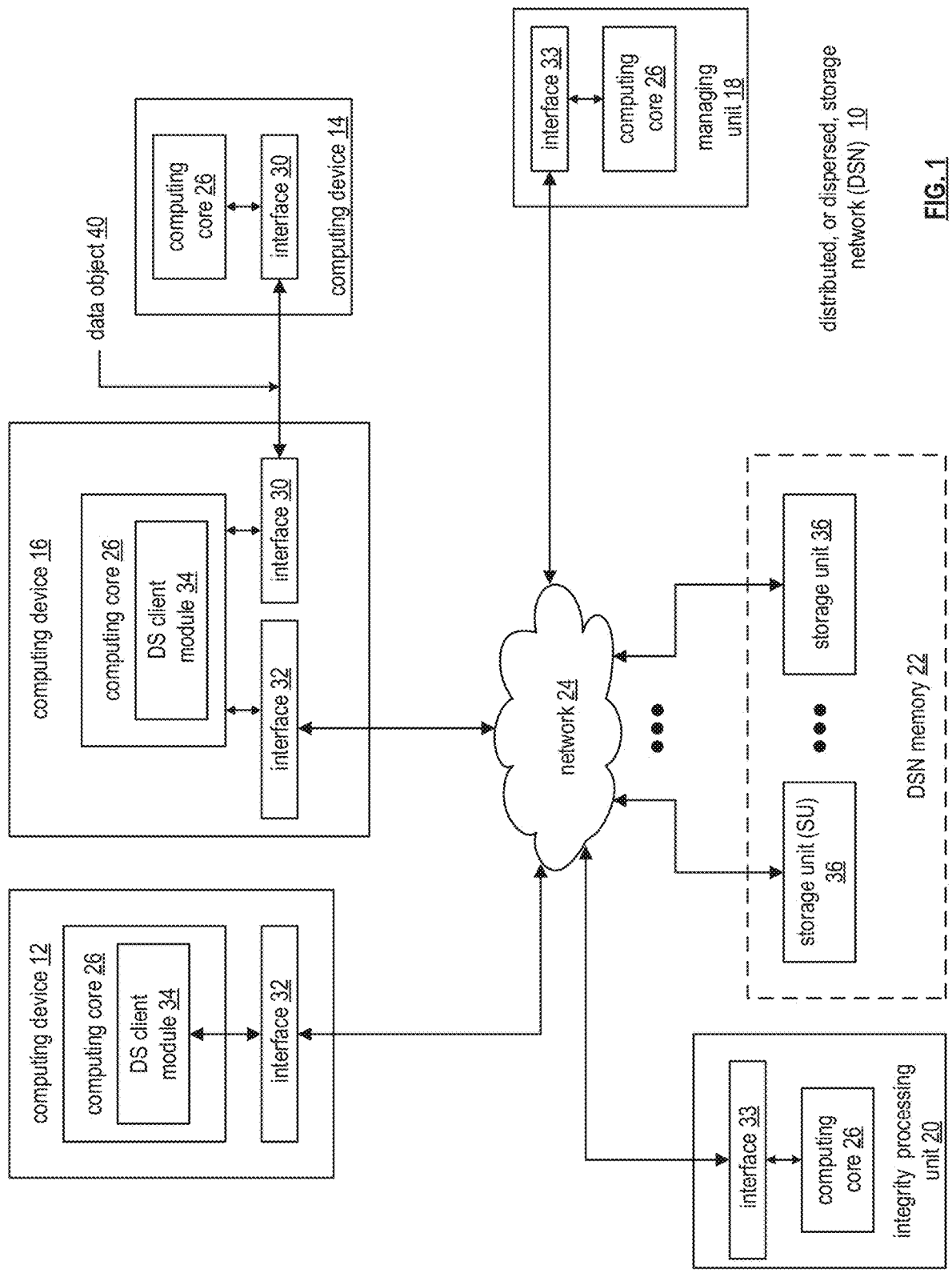
FIG. 1 is a schematic block diagram of an embodiment of a dispersed or distributed storage network (DSN) in accordance with the present disclosure.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
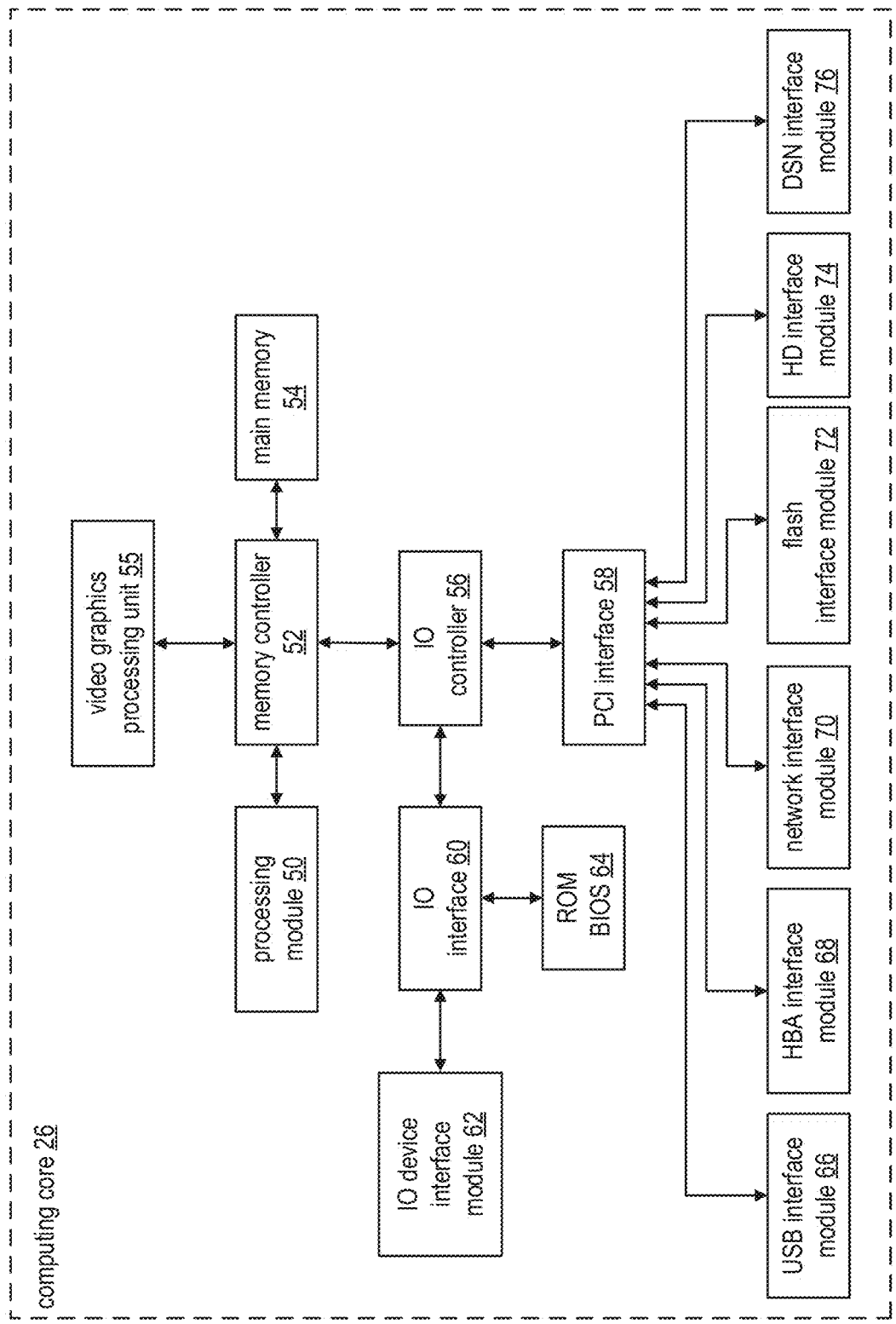
FIG. 2 is a schematic block diagram of an embodiment of a computing core in accordance with the present disclosure.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed storage (DS) error encoded data.

Each of the storage units 36 is operable to store DS error encoded data and/or to execute (e.g., in a distributed manner) maintenance tasks and/or data-related tasks. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, maintenance tasks (e.g., rebuilding of data slices, updating hardware, rebooting software, restarting a particular software process, performing an upgrade, installing a software patch, loading a new software revision, performing an off-line test, prioritizing tasks associated with an online test, etc.), etc.

Each of the computing devices 12-16, the managing unit 18, the integrity processing unit 20, and (in various embodiments) the storage units 36 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data object 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate per-access billing information. In another instance, the managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation/access requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10. Examples of load balancing, service differentiation and dynamic resource selection for data access operations are discussed in greater detail with reference to FIGS. 9-13.

To support data storage integrity verification within the DSN 10, the integrity processing unit 20 (and/or other devices in the DSN 10) may perform rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. Retrieved encoded slices are checked for errors due to data corruption, outdated versioning, etc. If a slice includes an error, it is flagged as a 'bad' or 'corrupt' slice. Encoded data slices that are not received and/or not listed may be flagged as missing slices. Bad and/or missing slices may be subsequently rebuilt using other retrieved encoded data slices that are deemed to be good slices in order to produce rebuilt slices. A multi-stage decoding process may be employed in certain circumstances to recover data even when the number of valid encoded data slices of a set of encoded data slices is less than a relevant decode threshold number. The rebuilt slices may then be written to DSN memory 22. Note that the integrity processing unit 20 may be a separate unit as shown, included in DSN memory 22, included in the computing device 16, and/or distributed among the storage units 36.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of five, a decode threshold of three, a read threshold of four, and a write threshold of four. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number. In the illustrated example, the value X11=aD1+bD5+cD9, X12=aD2+bD6+cD10, . . . X53=mD3+nD7+oD11, and X54=mD4+nD8+oD12.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as at least part of a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
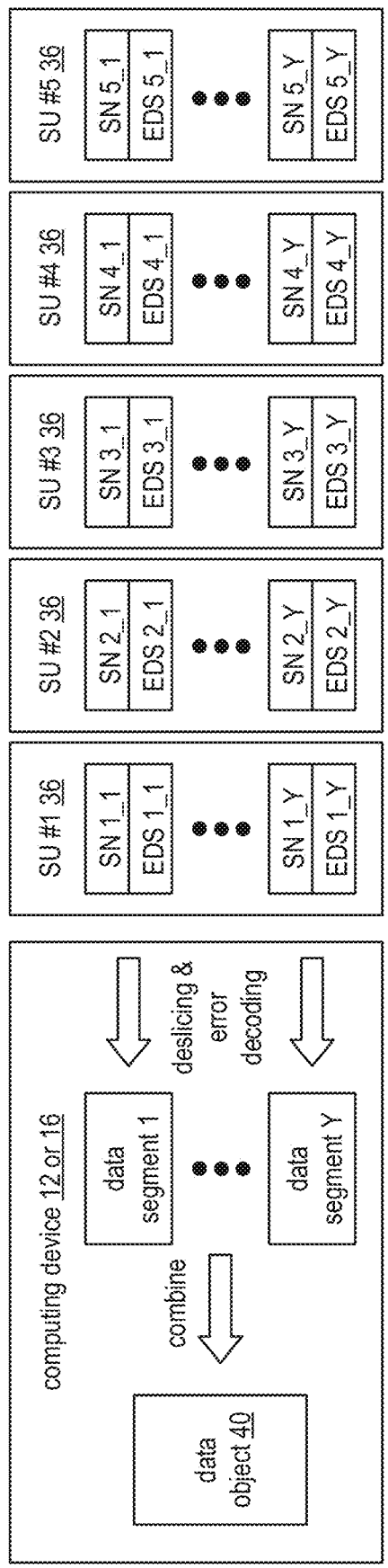
FIG. 7 is a schematic block diagram of an example of dispersed storage error decoding of data in accordance with the present disclosure.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
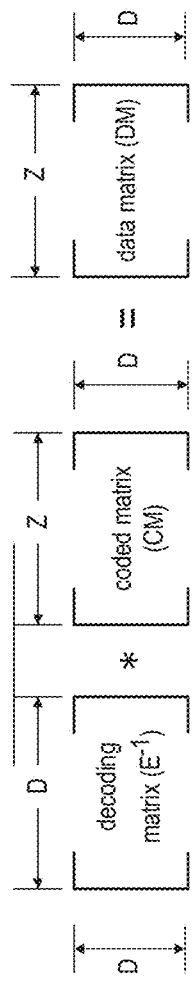
FIG. 8 is a schematic block diagram of a generic example of an error decoding function in accordance with the present disclosure.

In order to recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
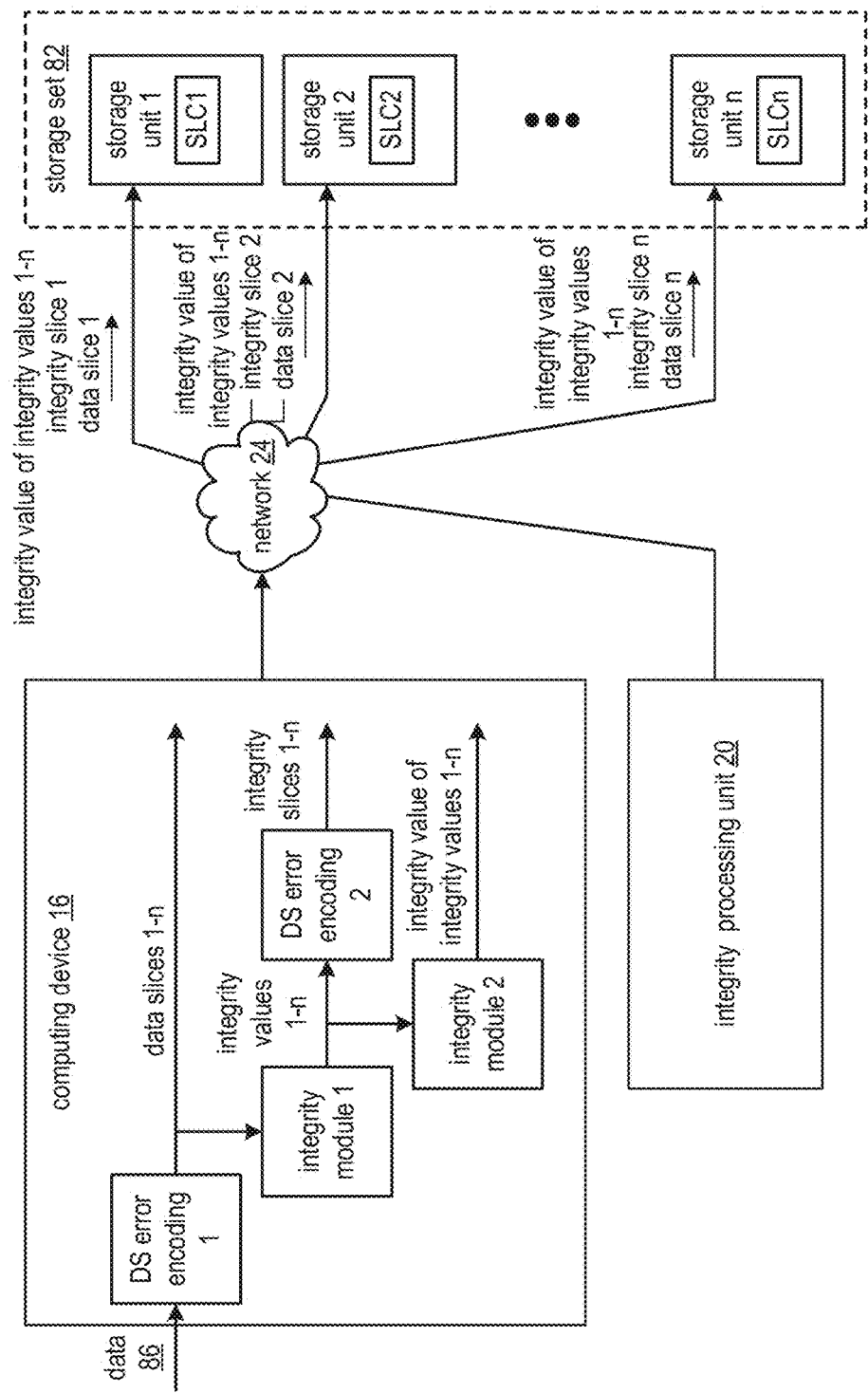
FIG. 9 is a schematic block diagram of another embodiment of a DSN generating data slice integrity information in accordance with the present disclosure.

FIG. 9 is a schematic block diagram of another embodiment of a dispersed storage network (DSN) generating data slice integrity information in accordance with the present disclosure. The illustrated DSN includes a computing device 16, the integrity processing unit 20 of FIG. 1, the network 24 of FIG. 1, and a storage set 82. The illustrated computing device 16 includes a dispersed storage (DS) error encoding 1, a DS error encoding 2, an integrity module 1, and an integrity module 2. Each DS error encoding may be implemented utilizing the DS error encoding of FIGS. 3-5. Each integrity module may be implemented utilizing the processing module 50 of FIG. 2. The storage set 82 includes a set of storage units 1-n. Each storage unit may be implemented utilizing the storage unit 36 of FIG. 1, and each of the storage units includes a DS client module 34, a processing module and memory (not separately illustrated). The storage units of a storage set may be located at a same physical location (site) or located at multiple physical locations without departing from the technology as described herein. Hereafter, each storage unit may be interchangeably referred to as a storage unit and the storage set may be referred to as a set of storage units. The illustrated DSN functions to encode slice integrity information.

In general, DSN memory stores a plurality of dispersed storage (DS) error encoded data. The DS error encoded data may be encoded in accordance with one or more examples described with reference to FIGS. 3-6, and organized (for example) in slice groupings or pillar groups. The data that is encoded into the DS error encoded data may be of any size and/or of any content. For example, the data may be one or more digital books, a copy of a company's emails, a large-scale Internet search, a video security file, one or more entertainment video files (e.g., television programs, movies, etc.), data files, and/or indexing and key information for use in dispersed storage operations.

In an example of operation of the encoding of the slice integrity information, the computing device 16 receives a data segment for storage, where received data 86 is divided into a plurality of data segments in accordance with a segmentation scheme. Having received the data segment, the DS error encoding 1 dispersed storage error encodes the data segment in accordance with dispersal parameters to produce a set of encoded data slices 1-n such as described above. The dispersal parameters include an information dispersal algorithm (IDA) width=n and a decode threshold k, where the decode threshold number of encoded data slices of the set of encoded data slices is required to reproduce the data segment.

With the set of encoded data slices produced, the integrity module 1 applies an integrity function to each encoded data slice of the set of encoded data slices to produce a set of integrity values 1-n. Applying the integrity function includes selecting a deterministic function (e.g., extracted from system registry information or otherwise determined/received), and performing the deterministic function on the encoded data slice to produce an integrity value, where the deterministic function may include, for example, one or more of a hashing function, a hash-based message authentication code function (e.g., a keyed-hash message authentication code (HMAC)), a sponge function, and a mask generating function.

With the set of integrity values produced, the DS error encoding 2 dispersed storage error encodes the set of integrity values (e.g., as a single hash list) in accordance with the dispersal parameters (e.g., with the IDA with and decode threshold utilized by the DS error encoding 1) to produce a set of integrity slices 1-n. The integrity module 2 applies another integrity function to the set of integrity values to produce an integrity value of the set of integrity values 1-n (e.g., a hash of the single hash list), where the other integrity function may be substantially the same as the integrity function of the integrity module 1.

The computing device 16 facilitates storage of the set of encoded data slices 1-n, the set of integrity slices 1-n, (e.g., collectively slices 1-n: SLC 1-n) and the integrity value of the set of integrity values 1-n in the storage set 82. For example, for each storage unit, the computing device 16 generates a write slice request that includes an associated encoded data slice, an associated integrity slice, and integrity value of the set of integrity values 1-n, and sends, via the network 24, the write slice request to the storage set 82.

Figure 10:
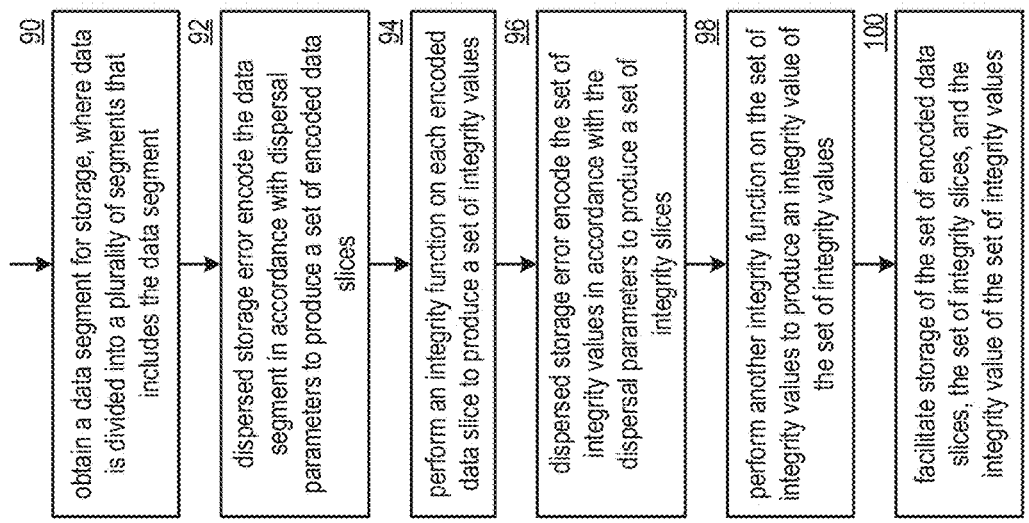
FIG. 10 is a logic diagram illustrating an example of encoding slice integrity information in accordance with the present disclosure.

FIG. 10 is a logic diagram illustrating an example of encoding slice integrity information in accordance with the present disclosure. The method includes step 90 where a processing module (e.g., of a computing device 16) obtains a data segment for storage, where data is divided into a plurality of segments that includes the data segment. The obtaining includes at least one of receiving the data segment and generating the data segment from the data.

The method continues at step 92 where the processing module dispersed storage error encodes the data segment in accordance with dispersal parameters to produce a set of encoded data slices. For example, the processing module obtains the dispersal parameters (e.g., generated, extracted from system registry information, or otherwise determined/received) and utilizes the dispersal parameters to encode the data segment to produce the set of encoded data slices.

The method continues at step 94 where the processing module performs an integrity function on each encoded data slice to produce a set of integrity values. For example, the processing module obtains the integrity function and applies the integrity function to each encoded data slice to produce a set of integrity values. The method continues at step 96 where the processing module dispersed storage error encodes the set of integrity values in accordance with the dispersal parameters to produce a set of integrity slices. For example, the processing module aggregates the set of integrity values into an integrity value list, and dispersed storage error encodes the integrity value list to produce the set of integrity slices.

The method continues at step 98 where the processing module performs another integrity function on the set of integrity values to produce an integrity value of the set of integrity values. For example, the processing module obtains the other integrity function and applies the other integrity function to the integrity value list to produce the integrity value of the set of integrity values. Next, at step 100, the processing module facilitates storage of the set of encoded data slices, the set of integrity values, and the integrity value of the set of integrity values. For example, for each encoded data slice, the processing module generates a write slice request that includes the encoded data slice, an associated integrity slice of the set of integrity slices, and integrity value of the set of integrity values, and sends the write slice request to an associated storage unit of a set of storage units for storage.

Figure 11:
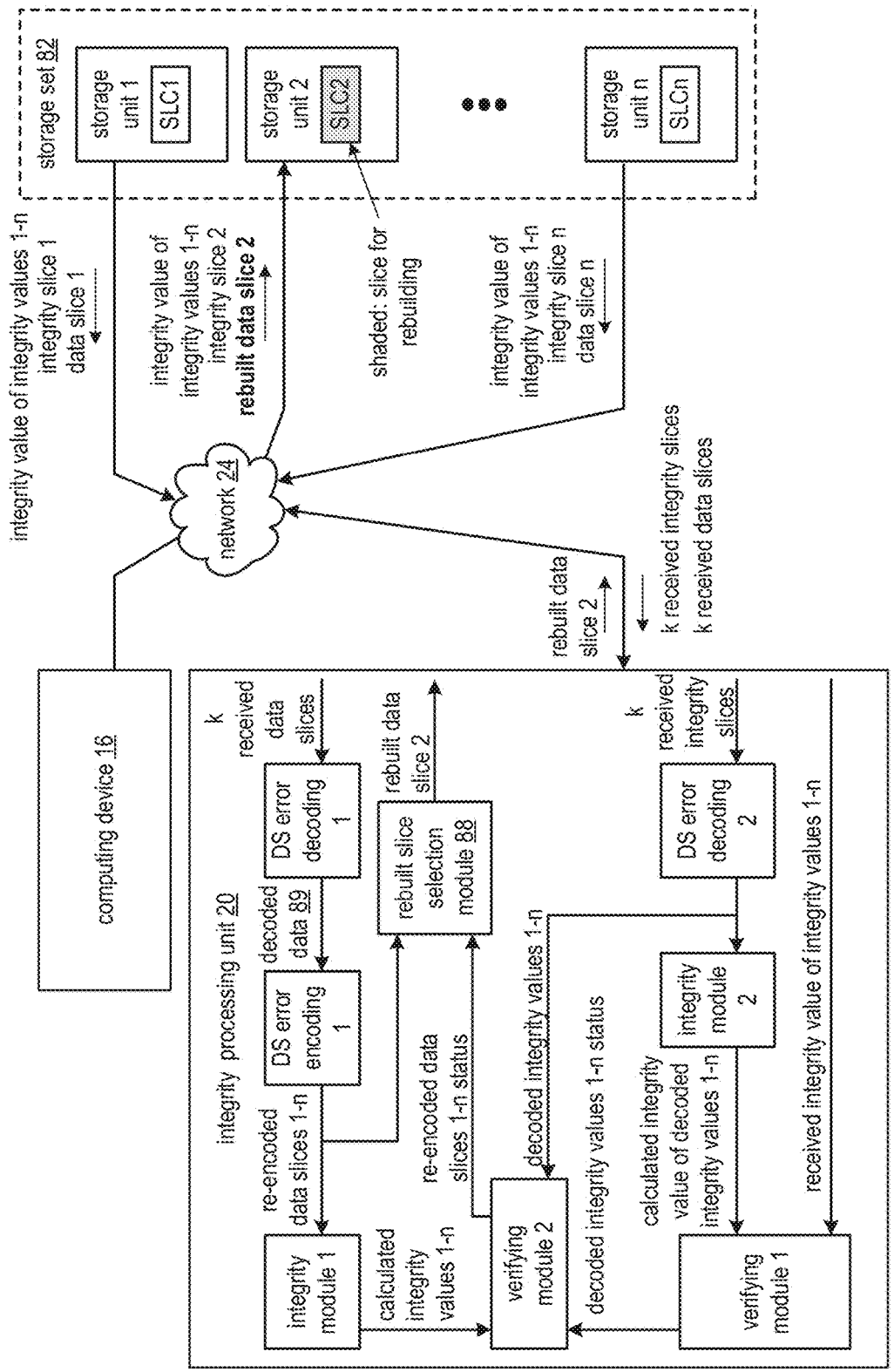
FIG. 11 is a schematic block diagram of another embodiment of a DSN performing integrity verification of an encoded data slice rebuilding result in accordance with the present disclosure.

FIG. 11 is a schematic block diagram of another embodiment of a dispersed storage network (DSN) performing integrity verification of an encoded data slice rebuilding result in accordance with the present disclosure. The illustrated DSN includes the computing device 16 of FIG. 9, the integrity processing unit 20 of FIG. 1, the network 24 of FIG. 1, and a storage set 82. The integrity processing unit 20 includes the integrity modules 1-2 of FIG. 9, the DS error encoding 1 of FIG. 9, DS error decoding 1-2, verifying modules 1-2, and a rebuilt slice selection module 88. The DS error decoding 1-2 may be implemented utilizing the DS error decoding described in conjunction with FIGS. 7 and 8. The verifying modules 1-2 and the rebuilt slice selection module 88 may be implemented utilizing the processing module 50 of FIG. 2. The storage set 82 includes a set of storage units 1-n. Each storage unit may be implemented utilizing the storage unit 36 of FIG. 1. Hereafter, each storage unit may be interchangeably referred to as a storage unit and the storage set may be referred to as a set of storage units. The DSN functions to verify integrity of an encoded data slice rebuilding result.

In an example of operation of verifying the integrity of an encoded data slice rebuilding result, the integrity processing unit 20 first determines to rebuild an encoded data slice associated with a storage error to produce a rebuilt encoded data slice, where a data segment is dispersed storage error encoded to produce a set of encoded data slices that includes encoded data slice and integrity information that is stored in the storage set 82 with regards to the set of encoded data slices. Determining to rebuild an encoded data slice may include at least one of receiving a rebuilt request and detecting a storage error associated with the encoded data slice.

Having determined to rebuild the encoded data slice, the DS error decoding 2 dispersed storage error decodes a decode threshold number k of integrity slices received via the network 24 to produce decoded integrity values 1-n. The integrity module 2 performs an integrity function on the decoded integrity values to produce a calculated integrity value of the decoded integrity values 1-n. The verifying module 1 generates a status indication for the decoded integrity values 1-n which indicates that the decoded integrity values are valid when the calculated integrity value of the decoded integrity values substantially matches a received (via the network 24) integrity value of the integrity values 1-n. If a plurality of integrity values of the integrity values 1-n are received from the storage set 82, the verifying module 1 may compare the plurality of integrity values to verify that the integrity values match. If the received integrity values of the integrity values 1-n do not match, the verifying module 1 may establish a particular integrity value as the correct integrity value by determining, for example, that a plurality, majority or other threshold number of received integrity values of the integrity values 1-n are identical and presumably correct.

The DS error decoding 1 decodes a decode threshold number of k received encoded data slices to produce decoded data 89. The DS error encoding 1 re-encodes the decoded data 89 to produce re-encoded data slices 1-n. The integrity module 1 performs an integrity function on the re-encoded data slices to produce calculated integrity values 1-n. The verifying module 2 generates a re-encoded data slices 1-n status indicating that the re-encoded data slices are valid when the calculated integrity values 1-n substantially matches the validated (by verifying module 1) decoded integrity values 1-n. Alternatively, or in addition, the verifying module 2 may compare an individual one of the calculated integrity values 1-n (e.g., for rebuilt data slice 2) to a corresponding validated decoded integrity value to determine if a particular rebuilt data slice is valid. If a rebuilt data slice is determined to be invalid, the integrity processing unit 20 may employ additional correction approaches in an attempt to rebuild the invalid data slice, including multi-stage and/or iterative approaches that utilize data from both valid and invalid slices.

The rebuilt slice selection module 88 selects a corresponding valid re-encoded data slice as the rebuilt encoded data slice when the re-encoded data slices 1-n status indicates that the re-encoded data slices are valid. In the illustrated example, the rebuilt slice selection module 88 selects rebuilt data slice 2 to replace an encoded data slice 2 of storage unit 2 associated with a storage error. Having selected the rebuilt encoded data slice, the integrity processing unit 20 sends the rebuilt encoded data slice to an associated storage unit for storage. In this example, the integrity processing unit 20 sends, via the network 24, the rebuilt encoded data slice 2 to the storage unit 2 for storage. As described more fully below in conjunction with FIGS. 13 and 14, the integrity processing unit 20 may further send verified integrity values 1-n and/or other integrity information to the storage unit 2 for use in verifying the rebuilt encoded data slice as received. In the event an additional received encoded data (e.g., other than encoded data slice 2) is identified as invalid during the verification process, the integrity processing unit 20 may further signal to the storage set 82 and/or other DSN entities that the data slice is invalid and needs to be rebuilt.

As further described below in conjunction with FIGS. 13 and 14, the integrity processing unit 20 may also relay "proof of authenticity" (POA) information received from storage units of storage set 82 to the storage unit receiving the rebuilt data slice. Such POA information may comprise a digital signature, message authentication code, or other cryptographically secure integrity verification code that is verifiable by the recipient storage unit (though not necessarily verifiable by the integrity processing unit 20). The validity of the POA information is calculated by the recipient storage unit in order to ascertain the correctness of at least one of the received slice name, the received slice revision, received integrity values 1-n or a received integrity value of integrity values 1-n.

Figure 12:
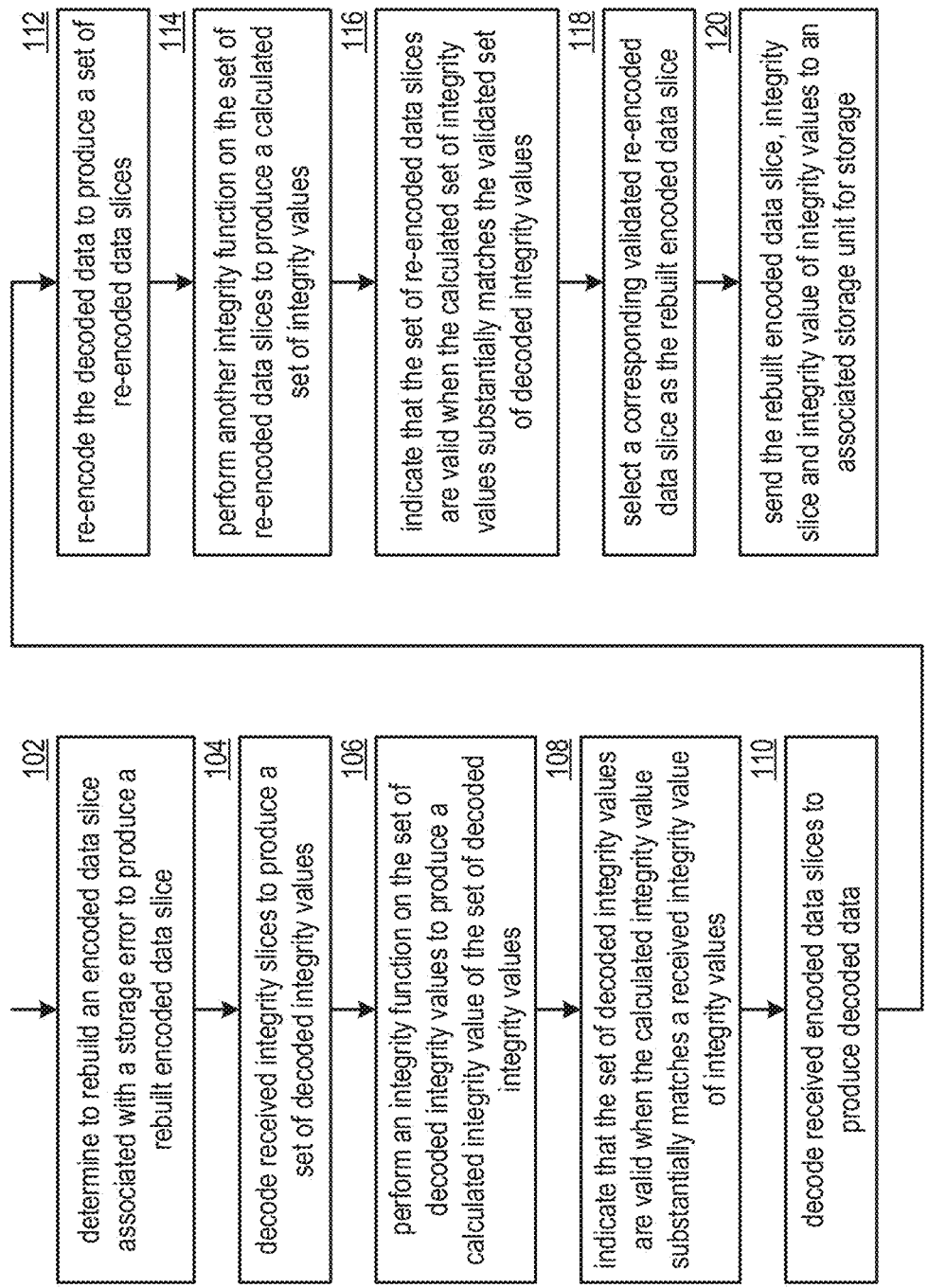
FIG. 12 is a logic diagram illustrating an example of verifying integrity of an encoded data slice rebuilding result in accordance with the present disclosure.

FIG. 12 is a logic diagram illustrating an example of verifying integrity of an encoded data slice rebuilding result in accordance with the present disclosure. The method includes step 102 where a processing module (e.g., of an integrity processing unit) determines to rebuild the encoded data slice to produce a rebuilt encoded data slice. Determining to rebuild the encoded data slice may include at least one of detecting a storage error associated with the encoded data slice, receiving a rebuilding request, and determining that slice integrity information is available.

The method continues at step 104 where the processing module decodes received integrity slices to produce a set of decoded integrity values. For example, the processing module issues read slice requests to storage units of a storage set, receives a decode threshold number of integrity slices, and dispersed storage error decodes the decode threshold number of received integrity slices to produce the set of decoded integrity values. In other examples, the processing may receive the set of integrity values directly from one or more of the storage units of the storage set without the need to perform separate dispersed storage error decoding operations.

Next, at step 106, the processing module performs an integrity function on the set of decoded integrity values to produce a calculated integrity value of the set of decoded integrity values. For example, the processing module applies an associated deterministic function to the set of decoded integrity values to produce the calculated integrity value of the set of decoded integrity values. The method continues at step 108 where the processing module indicates that the set of decoded integrity values are valid when the calculated integrity value substantially matches a received integrity value relating to the set of decoded integrity values. The received integrity value may be obtained, for example, by extracting it from a read slice response after issuing a query and receiving a query response.

The method continues at step 110 where the processing module decodes received encoded data slices to produce decoded data. For example, the processing module issues read slice requests, receives a decode threshold number of encoded data slices, and dispersed storage error decodes the decode threshold number of received encoded data slices to produce the decoded data. Next, at step 112, the processing module re-encodes the decoded data to produce a set of re-encoded data slices. For example, the processing module dispersed storage error encodes the decoded data to produce the set of re-encoded data slices. The method continues at step 114 where the processing module performs another integrity function on the set of re-encoded data slices to produce a calculated set of integrity values. For example, the processing module applies the deterministic function to the set of re-encoded data slices to produce the calculated set of integrity values.

The method continues at step 116 where the processing module indicates that the set of re-encoded data slices is valid when the calculated set of integrity values substantially matches the validated set of decoded integrity values. The method continues at step 118 where the processing module selects a corresponding validated re-encoded data slice as the rebuilt encoded data slice. For example, the processing module identifies the encoded data slice (e.g., based on the determining to rebuild the encoded data slice) and extracts the encoded data slice from associated set of re-encoded data slices.

The illustrated method continues at step 120, where the processing module sends the rebuilt encoded data slice to an associated storage unit for storage. For example, the processing module identifies the storage unit based on an identifier of the rebuilt encoded data slice and issues a write slice request to the identified storage unit, where the request includes the rebuilt encoded data slice. Alternatively, or in addition to, the write slice request further includes a corresponding calculated integrity slice and the integrity value of the set of integrity values for use in facilitating future rebuild operations utilizing the information stored in the identified storage unit (e.g., if a storage error is subsequently identified for a related encoded data slice stored in another storage unit of the set of storage units).

Figure 13:
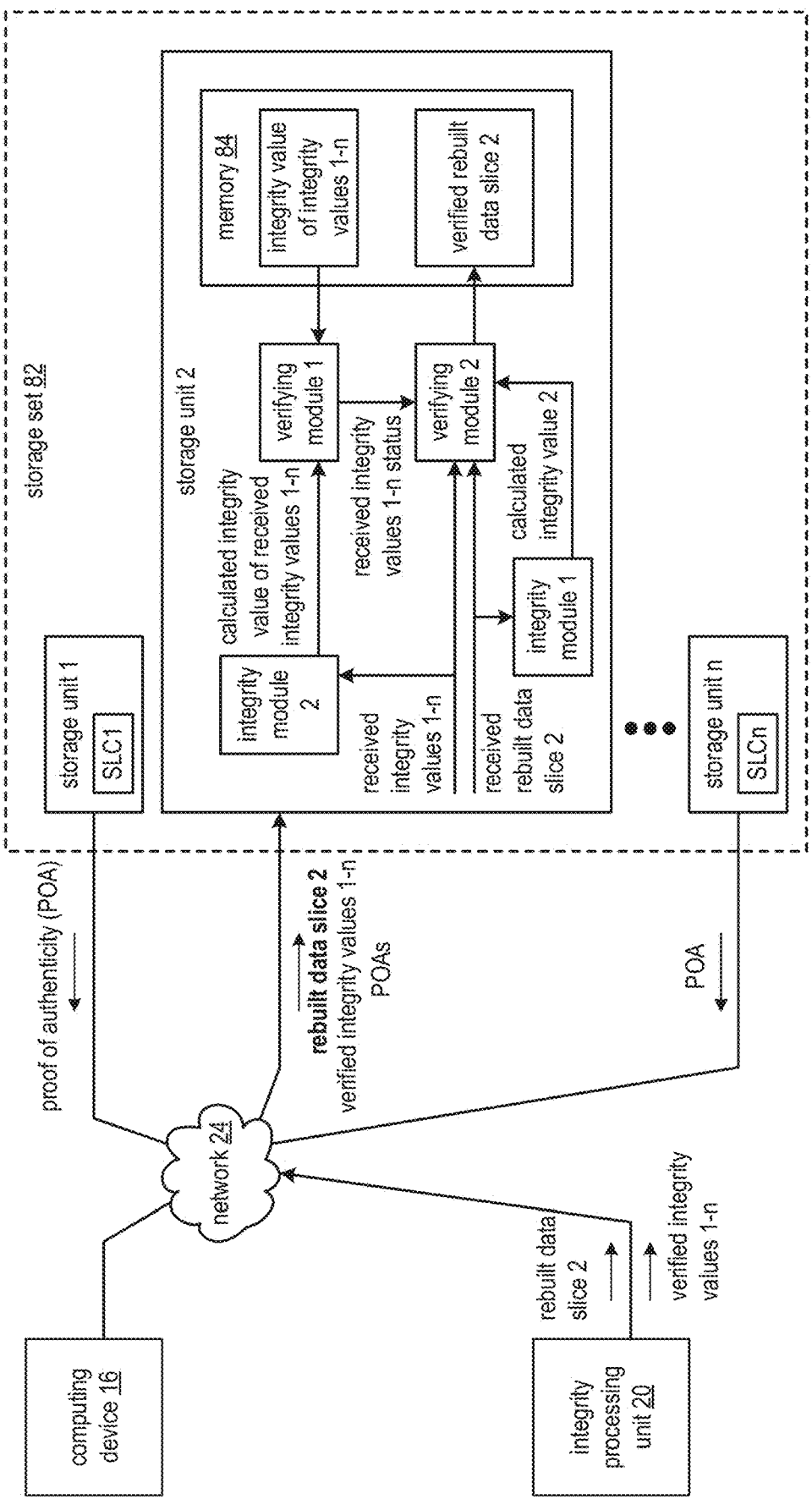
FIG. 13 is a schematic block diagram of another embodiment of a DSN performing integrity verification of a received encoded data lice in accordance with the present disclosure.

FIG. 13 is a schematic block diagram of another embodiment of a DSN performing integrity verification of a received encoded data slice in accordance with the present disclosure. The illustrated DSN includes the computing device 16 of FIG. 9, the integrity processing unit 20 of FIG. 11, the network 24 of FIG. 1, and a storage set 82. The storage set 82 includes a plurality of storage units 1-n. Each storage unit includes the integrity modules 1-2 of FIG. 9 and the verifying modules 1-2 of FIG. 11. Each storage unit may be implemented utilizing the storage unit 36 of FIG. 1, and may include a network interface(s), a controller, a processing module, a controller, a DS client module, a distributed task execution module, and memory 84 of sufficient size to store a significant number of encoded data slices (e.g., thousands of slices to hundreds-of-millions of slices) and may include one or more hard drives and/or one or more solid-state memory devices (e.g., flash memory, DRAM, etc.). The DSN functions to verify integrity of a received encoded data slice for storage.

In an example of operation of verifying the integrity of a received encoded data slice for storage, a storage unit of the storage set 82 receives a write slice request (e.g., a verifiable rebuild write request) that includes one or more of a rebuilt encoded data slice, a slice name, a revision number, verified integrity values 1-n (e.g., a list of hash values of a set of encoded data slices that includes the encoded data slice), and an integrity value of verified integrity values 1-n. For example, the integrity processing unit 20 issues, via the network 24, the write slice request to the storage unit 2, where the write slice request includes a rebuilt encoded data slice 2 and the verified integrity values 1-n.

The integrity module 2 performs an integrity function on the received integrity values to produce a calculated integrity value of received integrity values 1-n. For example, the integrity module 2 performs a deterministic function on the received integrity values 1-n to produce the calculated integrity value of the received integrity values 1-n. The verifying module 1 then produces a received integrity values 1-n status that indicates that the received integrity values are valid when the calculated integrity value of the received integrity values compares favorably to a stored integrity value of integrity values 1-n retrieved from the memory 84 (e.g., as stored during an initial storage process as described with reference to FIGS. 9 and 10).

The integrity module 1 performs another integrity function on the received rebuilt encoded data slice to produce a calculated integrity value. For example, the integrity module 1 performs another deterministic function on the received rebuilt encoded data slice 2 to produce a calculated integrity value 2. When the verifying module 2 verifies that the calculated integrity value of the received rebuilt encoded data slice compares favorably to a corresponding integrity value of the validated received integrity values 1-n, the verifying module 2 stores the received rebuilt encoded data slice in the memory 84.

For example, when the calculated integrity value 2 substantially matches a received integrity value 2, the verify module 2 stores the received rebuilt encoded data slice 2 as a verified rebuilt encoded data slice 2 in the memory 84. Storing of a verified rebuilt encoded data slice includes at least one of overwriting an encoded data slice associated with a storage error (e.g., encoded data slice 2) with the received rebuilt encoded data slice (e.g., rebuilt encoded data slice 2) and storing the received rebuilt encoded data slice in an unused portion of the memory 84.

In the illustrated example, storage unit 2 further receives proof of authenticity (POA) information from storage units of the storage set 82 that participated in the encoded data slice rebuilding process. Such POA information may be retrieved by the integrity processing unit 20 and relayed to the storage unit 2 in conjunction with the rebuilt data slice 2. The POA information provided by a storage unit may comprise, for example, a digital signature of the slice name, slice revision and integrity values 1-n (e.g., a hash list for the relevant set of encoded data slices), and may be computed by the storage unit using a private key associated with the storage unit. In addition, the POA information may be stored by the storage unit or calculated in real time in response to a rebuild/read request. When a recipient storage unit is able to verify POA information provided from an IDA threshold number of storage units, the recipient storage unit is able to effectively prove the authenticity of the set of integrity values 1-n for a given encoded data slice (and may condition acceptance of the encoded data slice on such verification). Verification of the POA information may be performed by one or more of the illustrated components of storage unit 2 or a dedicated (not separately illustrated) module.

Figure 14:
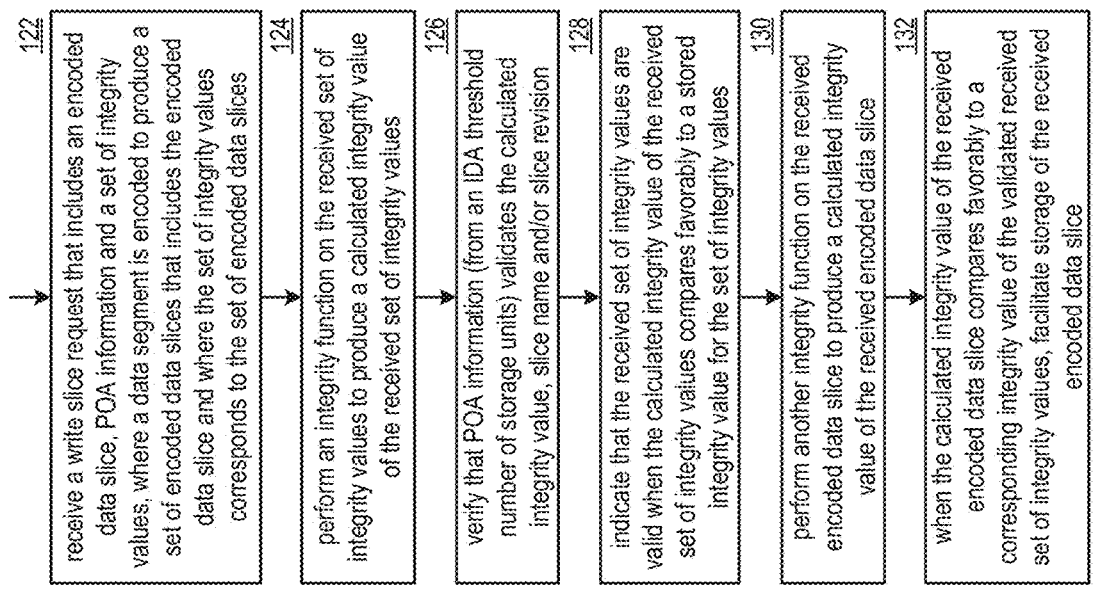
FIG. 14 is a logic diagram illustrating another example of verifying integrity of a received encoded data slice for storage in accordance with the present disclosure.

FIG. 14 is a logic diagram illustrating another example of verifying integrity of a received encoded data slice for storage in accordance with the present disclosure. The method includes step 122 where a processing module (e.g., of a storage unit 36) receives a write slice request that includes an encoded data slice, POA information and a set of integrity values, where a data segment is encoded to produce a set of encoded data slices that includes the encoded data slice and where the set of integrity values corresponds to the set of encoded data slices. For example, the processing module receives a verifiable rebuild write request that includes a rebuilt encoded data slice as the encoded data slice.

The method continues at step 124 where the processing module performs an integrity function on the received set of integrity values to produce a calculated integrity value of the received set of integrity values. For example, the processing module performs a deterministic function on the received set of integrity values to produce a calculated integrity value. Next, at step 126, the processing module verifies that the received POA information (such as described above) validates one or more of the calculated integrity value, the name or the encoded data slice, or revision level information for the encoded data slice. Validation may depend on verification of POA information from at least an IDA threshold number of storage units (e.g., storage units that participated in rebuilding of the received encoded data slice), and provides assurances that an intermediary has not spoofed or forged the write slice request. If the verification of the received POA information is not successful, the processing module may be configured to reject the received encoded data slice.

The method proceeds at step 128 where the processing module indicates that the received set of integrity values are valid when a calculated integrity value of the received set of integrity values compares favorably to a stored integrity value for the set of integrity values. For example, the processing module compares the calculated integrity value of the received set of integrity values to a retrieved previously stored integrity value for the set of integrity values, where the retrieved previously stored integrity value was previously stored in local memory during an initial write request. Alternatively, or in addition to, the stored integrity value is received in association with the write slice request.

The method continues at step 130 where the processing module performs another integrity function on the received encoded data slice to produce a calculated integrity value of the received encoded data slice. For example, the processing module performs the deterministic function on the received encoded data slice to produce the calculated integrity value of the received encoded data slice. When the calculated integrity value of the received encoded data slice compares favorably (e.g., substantially the same) to a corresponding integrity value of the validated received set of integrity values, the method continues at step 132 where the processing module facilitates storage of the received encoded data slice. For example, the processing module compares the related integrity value of the received encoded data slice to the corresponding integrity value of the validated received set of integrity values, and stores the received encoded data slice in a local memory when the comparison is favorable.

The methods described above in conjunction with the computing device 16, integrity processing unit 20 and storage units 36 can alternatively be performed by other modules (e.g., DS client modules 34) of a dispersed storage network or by other devices (e.g., managing unit 20). Any combination of a first module, a second module, a third module, a fourth module, etc. of the computing devices and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information. A computer readable memory/storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of a storage network, the method comprises:
   receiving, by a storage unit of the storage network, an encoded data slice of a set of encoded data slices for storage in the storage unit;
   receiving, by the storage unit, a set of integrity values corresponding to the set of encoded data slices, the set of integrity values generated by performing a first integrity function on each of the encoded data slices of the set of encoded data slices;
   performing, by the storage unit, a second integrity function on the set of integrity values to produce a calculated integrity value of the set of integrity values;
   indicating that the set of integrity values are validated when the calculated integrity value matches a locally stored integrity value;
   performing, by the storage unit, the first integrity function on the received encoded data slice to produce a calculated integrity value of the received encoded data slice; and
   indicating that the received encoded data slice is valid when the calculated integrity value of the received encoded data slice matches a corresponding integrity value of the validated set of integrity values.

2. The method of claim 1 further comprises:
   when the received encoded data slice is indicated as valid, storing the received encoded data slice in memory of the storage unit.

3. The method of claim 1 further comprises:
   receiving proof of authenticity information relating to the received encoded data slice;
   determining whether the proof of authenticity information validates the set of integrity values; and
   conditioning storage of the received encoded data slice upon validation of the set of integrity values by the proof of authenticity information.

4. The method of claim 3, wherein the proof of authenticity information comprises a digital signature or message authentication code of the set of integrity values.

5. The method of claim 3, wherein each encoded data slice of the set of encoded data slices is an encoded portion of a data segment of a data object, in which the data object is segmented into a plurality of data segments and respective data segments are encoded into n number of encoded data slices, and in which a decode threshold number of encoded data slices for a respective data segment is needed to decode the respective data segment, where the decode threshold number is less than n, and wherein receiving proof of authenticity information comprises receiving at least the decode threshold number of digital signatures or message authentication codes from storage units storing encoded data slices of the set of encoded data slices.

6. The method of claim 1 further comprises:
   detecting a storage error associated with the encoded data slice; and
   issuing a rebuild request for the encoded data slice, wherein the received encoded data slice is received in response to the rebuild request.

7. The method of claim 1, wherein the first integrity function and the second integrity function are the same deterministic function.

8. A computer readable storage medium comprises:
   at least one memory section that stores operational instructions that, when executed by one or more processing modules of a storage network that include a processor, causes the one or more processing modules to:
   receive an encoded data slice of a set of encoded data slices for storage;
   receive a set of integrity values corresponding to the set of encoded data slices, the set of integrity values generated by performing a first integrity function on each of the encoded data slices of the set of encoded data slices;
   perform a second integrity function on the set of integrity values to produce a calculated integrity value of the set of integrity values;
   indicate that the set of integrity values are validated when the calculated integrity value matches a locally stored integrity value;
   perform the first integrity function on the received encoded data slice to produce a calculated integrity value of the received encoded data slice; and
   indicate that the received encoded data slice is valid when the calculated integrity value of the received encoded data slice matches a corresponding integrity value of the validated set of integrity values.

9. The computer readable storage medium of claim 8, wherein the at least one memory section stores further operational instructions that, when executed by the one or more processing modules, causes the one or more processing modules to:

when the received encoded data slice is indicated as valid, store the received encoded data slice.

10. The computer readable storage medium of claim 9, wherein the at least one memory section stores further operational instructions that, when executed by the one or more processing modules, causes the one or more processing modules to:
receive proof of authenticity information relating to the received encoded data slice;
determine whether the proof of authenticity information validates the set of integrity values; and
condition storage of the received encoded data slice upon validation of the set of integrity values by the proof of authenticity information.

11. The computer readable storage medium of claim 10, wherein the proof of authenticity information comprises a digital signature or message authentication code of a calculated integrity value of the set of integrity values.

12. The computer readable storage medium of claim 10, wherein each encoded data slice of the set of encoded data slices is an encoded portion of a data segment of a data object, in which the data object is segmented into a plurality of data segments and respective data segments are encoded into n number of encoded data slices, and in which a decode threshold number of encoded data slices for a respective data segment is needed to decode the respective data segment, where the decode threshold number is less than n, and wherein receiving proof of authenticity information comprises receiving at least the decode threshold number of digital signatures or message authentication codes from storage units storing encoded data slices of the set of encoded data slices.

13. The computer readable storage medium of claim 8, wherein the at least one memory section stores further operational instructions that, when executed by the one or more processing modules, causes the one or more processing modules to:
detect a storage error associated with the encoded data slice; and
issue a rebuild request for the encoded data slice, wherein the received encoded data slice is received in response to the rebuild request.

14. The computer readable storage medium of claim 8, wherein the first integrity function and the second integrity function are the same deterministic function.

15. A computing device of a storage network, the computing device comprises:
a network interface;
local memory; and
a processing module operably coupled to the network interface and the local memory, wherein the processing module operates to:
receive, via the network interface, an encoded data slice of a set of encoded data slices for storage;
receive, via the network interface, a set of integrity values corresponding to the set of encoded data slices, the set of integrity values generated by performing a first integrity function on each of the encoded data slices of the set of encoded data slices;
perform a second integrity function on the set of integrity values to produce a calculated integrity value of the set of integrity values;
indicate that the set of integrity values are validated when the calculated integrity value matches a locally stored integrity value;
perform the first integrity function on the received encoded data slice to produce a calculated integrity value of the received encoded data slice; and
indicate that the received encoded data slice is valid when the calculated integrity value of the received encoded data slice matches a corresponding integrity value of the validated set of integrity values.

16. The computing device of claim 15, wherein the processing module further operates to:
when the received encoded data slice is indicated as valid, store the received encoded data slice in the local memory.

17. The computing device of claim 15, wherein the processing module further operates to:
receive, via the network interface, proof of authenticity information relating to the received encoded data slice;
determine whether the proof of authenticity information validates the set of integrity values; and
condition storage of the received encoded data slice upon validation of the set of integrity values by the proof of authenticity information.

18. The computing device of claim 17, wherein the proof of authenticity information comprises a digital signature or message authentication code of a slice identifier associated with the received encoded data slice.

19. The computing device of claim 17, wherein each encoded data slice of the set of encoded data slices is an encoded portion of a data segment of a data object, in which the data object is segmented into a plurality of data segments and respective data segments are encoded into n number of encoded data slices, and in which a decode threshold number of encoded data slices for a respective data segment is needed to decode the respective data segment, where the decode threshold number is less than n, and wherein receiving proof of authenticity information comprises receiving at least the decode threshold number of digital signatures or message authentication codes from storage units storing encoded data slices of the set of encoded data slices.

20. The computing device of claim 15, wherein the processing module further operates to:
detect a storage error associated with the encoded data slice; and
issue a rebuild request for the encoded data slice, wherein the received encoded data slice is received in response to the rebuild request.

* * * * *